United States Patent [19]
Loeffler et al.

[11] Patent Number: 5,838,074
[45] Date of Patent: Nov. 17, 1998

[54] ANTI-THEFT SYSTEM FOR A MOTOR VEHICLE

[75] Inventors: Maximilian Loeffler, Bernhardswald; Herbert Zimmer, Regensburg, both of Germany

[73] Assignee: Siemens Aktiengesellschaft, Munich, Germany

[21] Appl. No.: 763,906

[22] Filed: Dec. 11, 1996

[30] Foreign Application Priority Data

Dec. 11, 1995 [DE] Germany .................. 195 46 171.1

[51] Int. Cl.⁶ ....................................... G01S 13/74
[52] U.S. Cl. ............... 307/10.2; 307/10.4; 307/10.5; 340/825.34; 340/825.54; 340/825.69; 340/825.72; 342/52
[58] Field of Search ................ 307/9.1–10.8; 180/287, 167; 340/425.5, 426, 435, 825.31, 825.34, 825.36, 825.44, 825.54, 825.69, 825.72; 364/423.098, 423.99, 424.045; 235/128, 380, 382, 382.5; 380/3; 342/42, 52, 51, 53

[56] References Cited

U.S. PATENT DOCUMENTS

| | | | |
|---|---|---|---|
| 4,630,044 | 12/1986 | Polzer | 340/825.54 |
| 4,654,658 | 3/1987 | Walton | 340/825.54 |
| 4,656,472 | 4/1987 | Walton | 340/825.34 |
| 4,738,334 | 4/1988 | Weishaupt | 180/287 |
| 5,053,774 | 10/1991 | Schuermann et al. | . |
| 5,287,112 | 2/1994 | Schuermann | 342/51 |
| 5,374,930 | 12/1994 | Schuermann | 342/51 |
| 5,477,214 | 12/1995 | Bartel | 340/825.31 |
| 5,519,376 | 5/1996 | Iijima | 307/10.2 |
| 5,532,522 | 7/1996 | Dietz et al. | 307/10.5 |

*Primary Examiner*—Jeffrey A. Gaffin
*Assistant Examiner*—Peter Ganjian
*Attorney, Agent, or Firm*—Herbert L. Lerner; Laurence A. Greenberg

[57] ABSTRACT

An anti-theft system for a motor vehicle includes a transceiver disposed in a motor vehicle and a portable transponder. If a magnetic alternating field of the transceiver is turned on, energy signals are transmitted inductively to the transponder, where they charge an energy storing device. As soon as the alternating field is turned off, a transponder oscillating circuit oscillates at its resonant frequency. This oscillation is transmitted inductively back to the transceiver. In the process, the resonant frequency is measured. Then, the exciter frequency of the alternating field is adapted to the resonant frequency of the transponder, so that the inductive energy transmission is as effective as possible in subsequent charging operations.

7 Claims, 2 Drawing Sheets

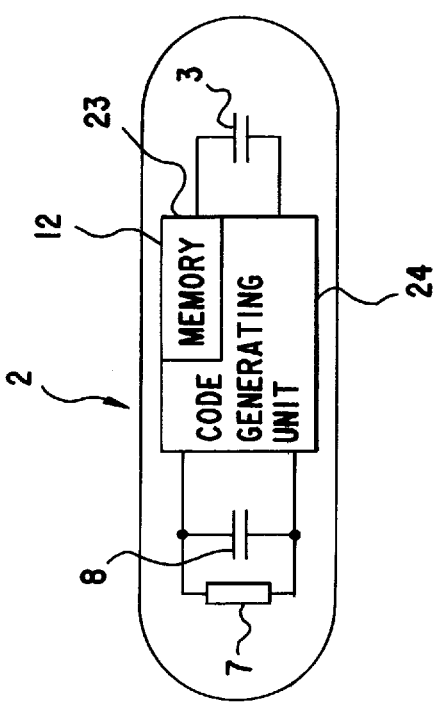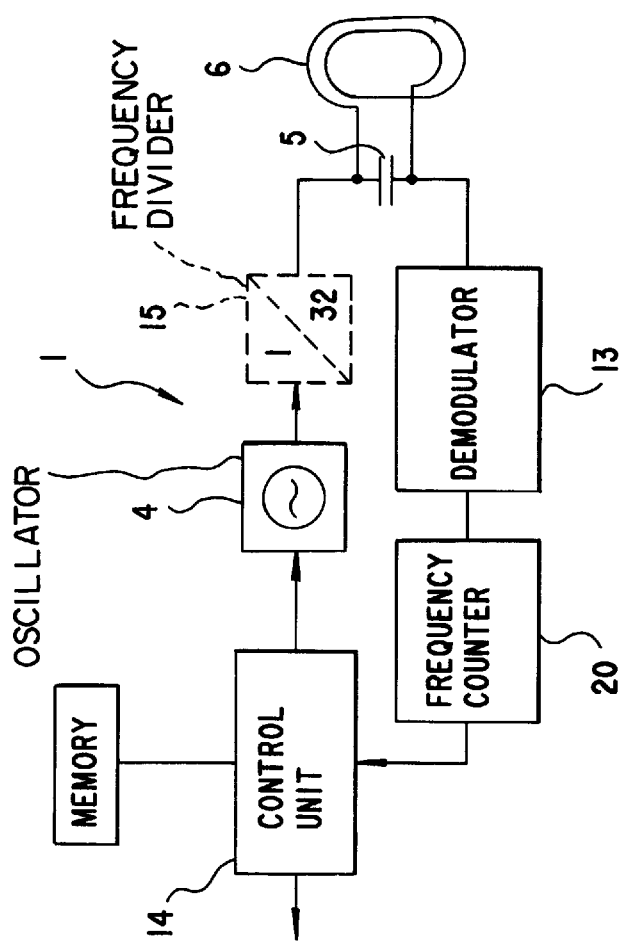

ANTI-THEFT SYSTEM FOR A MOTOR VEHICLE

BACKGROUND OF THE INVENTION

Field of the Invention

The invention relates to an anti-theft system for a motor vehicle. In particular, it pertains to an immobilizer, in which starting of the engine is allowed only upon proper authorization.

An anti-theft system known from U.S. Pat. No. 5,053,774 has a portable transponder which receives a question code signal from a stationary transceiver. After the question code signal is received, an answer code signal is sent back to the transceiver. Energy is transmitted in the question code signal, by which the answer code signal is tripped. The energy is stored temporarily in a battery. If there is enough energy in the battery, the code signal is tripped.

Both the transponder and the transceiver have respective oscillating circuits, which are inductively coupled to one another. The energy balance in the oscillating circuit is greatest when the oscillating circuit is oscillating at its resonant frequency. However, because of component tolerances and temperature factors, it can happen that the resonant frequencies differ from one another, so that less energy is transmitted to the transponder.

SUMMARY OF THE INVENTION

It is accordingly an object of the invention to provide an anti-theft system for a motor vehicle, which overcomes the hereinafore-mentioned disadvantages of the heretofore-known devices of this general type and with which an energy storing device in a transponder is charged quickly and reliably, so that immediately after a question code signal is received, an answer code signal can be transmitted.

With the foregoing and other objects in view there is provided, in accordance with the invention, an anti-theft system for a motor vehicle, comprising a transceiver disposed in a motor vehicle; and a portable transponder; the transceiver having an oscillator, an oscillating circuit excited to oscillate at a predetermined first frequency by the oscillator, causing energy signals to be transmitted at a first frequency to the transponder when the transponder is disposed in the immediate vicinity of the transceiver; the transponder having a transponder oscillating circuit, an energy storing device charged by the energy signals for causing the transponder oscillating circuit to oscillate at its resonant frequency and transmit data signals at a resonant frequency back to the transceiver; the transceiver having a frequency counter receiving the data signals and measuring the resonant frequency; and the transceiver having a control unit connected to the frequency counter and to the oscillator for controlling the oscillator to excite the oscillating circuit with a second frequency approximately matching the measured resonant frequency.

The resonant frequency of the transponder is measured. The exciter frequency of the oscillating circuit in the transceiver is then adapted to the resonant frequency of the transponder, so that as much energy as possible can be transmitted to the transponder. This has the advantage of requiring less energy for an authentication procedure. Moreover, the authentication procedure need not be discontinued for a lack of energy and restarted again. In other words, there is a time saving for the total authentication procedure.

In accordance with another feature of the invention, the transponder has a code generating unit storing a piece of code information or computation formula in memory and generating a code word from the code information or computation formula being transmitted back to the transceiver in the oscillation of the transponder oscillating circuit and amplitude-modulated as a function of the code information or computation formula.

In accordance with a further feature of the invention, the control unit demodulates the code word from the amplitude-modulated oscillation, compares the code word with a desired piece of code information and generates an enable signal if the code word and the desired piece of code information agree.

In accordance with an added feature of the invention, the energy storing device is a capacitor or a rechargeable battery.

In accordance with a concomitant feature of the invention, a value of the measured resonant frequency is stored in memory in the transceiver and is re-stored only if it deviates from a previously measured value.

Other features which are considered as characteristic for the invention are set forth in the appended claims.

Although the invention is illustrated and described herein as embodied in an anti-theft system for a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a schematic and block circuit diagram of an anti-theft system according to the invention;

DESCRIPTION OF THE PREFERRED EMBODIMENTS

Figure 2A:
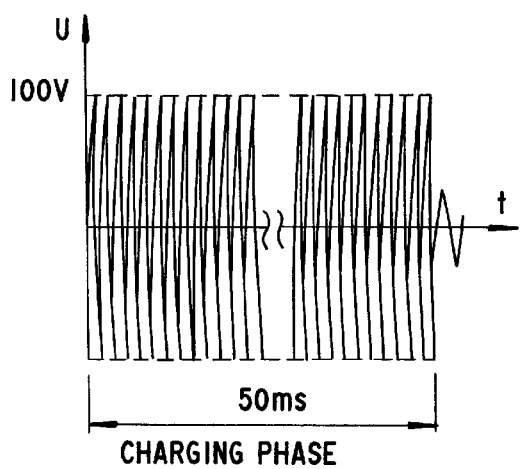
FIGS. 2a and 2b are oscillation diagrams of a transceiver and a transponder of the anti-theft system.

Referring now to the figures of the drawings in detail and first, particularly, to FIG. 1 thereof, there is seen an anti-theft system according to the invention which has a transceiver 1 disposed in a motor vehicle that cooperates with a portable transponder 2 through a transformer-type or inductive coupling when the transponder 2 is located in the vicinity of the transceiver 1. The transceiver 1 generates a magnetic alternating field, which oscillates at a predetermined frequency and by which a question code signal is transmitted to the transponder 2. The question code signal is a high-energy oscillation, with whose energy a charge capacitor 3 or a rechargeable battery in the transponder 2 is charged. If enough energy has been loaded into the charging capacitor 3 and the alternating field is turned off, then the transponder begins to oscillate, causing code signals to be transmitted back to the transceiver 1.

In order to transmit energy and to transmit data back again, the transceiver 1 has an antenna oscillating circuit 5, 6, which is excited to oscillate with the aid of an oscillator 4. To that end the antenna oscillating circuit 5, 6 has at least one capacitor 5 and one coil (referred to below as an antenna) 6.

The transponder 2 also has an oscillating circuit (referred to below as a transponder oscillating circuit) 7, 8 having a coil 7 and a capacitor 8. If the antenna 6 and the coil 7 are located in the immediate vicinity of one another, then an inductive coupling and thus a transmission of data or energy take place.

This is the case, for instance, whenever the transponder 2 is located on an ignition key and the antenna 6 is wound around an ignition lock of the motor vehicle. As soon as the ignition key is inserted into the ignition lock and the ignition key is turned, the antenna 6 and the coil 7 are electrically coupled with one another. As a consequence of the turning of the ignition key, a dialog between the transponder 2 and the transceiver 1 is initiated and carried out. An immobilizer can thus be disabled.

The oscillation of the transponder oscillating circuit 7, 8 is modulated in its amplitude by a piece of code information in the transponder 2. To that end, the transponder 2 may have a switch, which switches pulses of the code information for it back and forth between two load resistors. The switch may be controlled by a control unit 12 formed of a memory 23 and a code generating unit 24, a so-called transponder IC, which may be constructed as an integrated circuit.

The code information may be stored in a memory 23 in the transponder 2. However, the transponder 2 may also have an arithmetic unit, with the aid of which a piece of code information is generated. To that end, the transceiver 1 transmits a random number, which together with a mathematical algorithm (computation formula) stored in memory in the transponder 2 is processed to make a new code word.

The random number may be transmitted to the transponder in the energy oscillation or in a separate oscillation. The code word is then transmitted back to the transceiver 1 in the modulated oscillation.

In the transceiver 1, the random word is used with the aid of the mathematical algorithm that is also stored in memory in the transceiver 1, to generate a desired code word. If the code word that has been received and demodulated agrees with the desired code word generated in the transceiver 1, then an enable signal for undoing the immobilizer is generated. Such mathematical methods are also known as crypto methods. In such methods, it is not possible to read out the memorized algorithms. The immobilizer cannot later be undone by eavesdropping on the dialog between the transceiver 1 and the transponder 2, since the code signals are different on each attempted start.

Figure 2B:
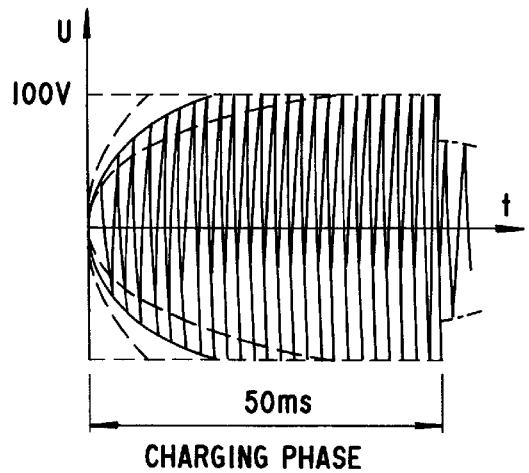

As soon as the ignition key is turned in the ignition lock, the transceiver 1 generates a magnetic alternating field of high field intensity, as is seen in FIG. 2a. The energy signals are generated within a predetermined period of time (charging phase), in this case for 50 ms, for instance. They have an amplitude of approximately 100 V. These energy signals charge the load capacitor 3 variably fast, as is seen in FIG. 2b, depending on the quality of the coupling between the transponder 2 and the transceiver 1, or in other words on the received field intensity.

Once the transmission of the energy signals has been completed, the charge capacitor 3 should already be extensively charged. In an ensuing reading phase, the transponder 2 detects the turnoff of the energy signals, since the transceiver 1 thereafter generates only an alternating field of low field intensity (on the order of magnitude of a few mV). The transponder 2 thereupon begins to oscillate. A kind of "response phase" or initializing phase of the transponder 2 begins, in which data are written into the transponder 2, read out from it, and/or mathematical calculations are performed.

The antenna oscillating circuit 5, 6 is compelled to oscillate at a first exciter frequency $f_{E1}$ by the oscillator 4 with an exciter variable. The output voltage or current of the oscillator 4 may be used as the exciter variable. The oscillator 4 oscillates at the oscillator frequency $f_0$. A frequency divider 15 which may additionally be provided as well between the oscillator 4 and the antenna oscillating circuit 5, 6, divides the oscillator frequency $f_0$ downward to the desired exciter frequency $f_{E1}$.

Through the use of the exciter variable, a stationary compelled oscillation of the antenna oscillating circuit 5, 6 occurs, and this oscillating circuit then oscillates at the exciter frequency $f_{E1}$.

Figure 3:
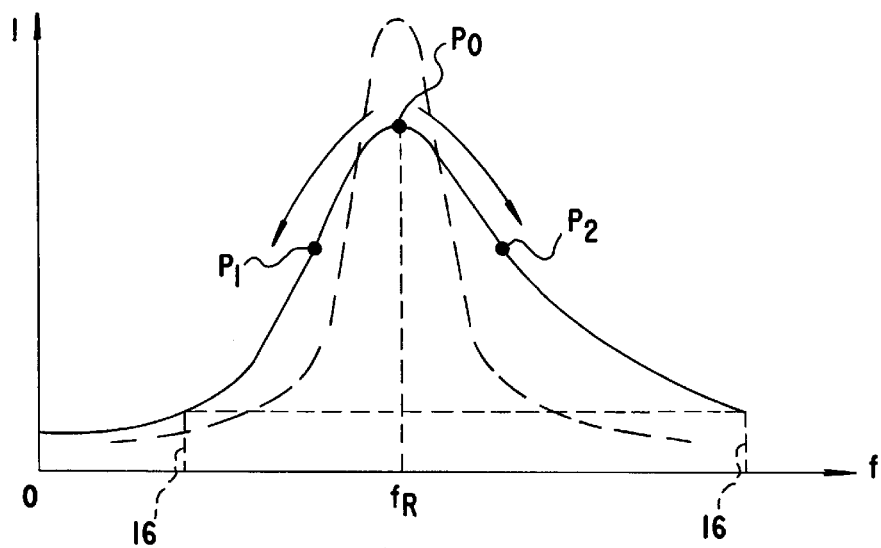
FIG. 3 is a graph of a resonance curve of an oscillating circuit.

Each oscillating circuit has a natural frequency, that is also referred to as a resonant frequency $f_R$, which is determined by the components of the oscillating circuit, that is in the case of the transceiver 1 essentially by the antenna 6 and the capacitor 5, and in the case of the transponder 2 by the coil 7 and the capacitor 8. The generated intensity (field intensity/amplitude) of the oscillation is highest if the oscillating circuit is excited at the exciter frequency $f_E$ which is equal to the resonant frequency $f_R$ (an operating point $P_i$ of the oscillating circuit is then at a resonant point $P_0$ as seen in FIG. 3). The most energy is transmitted to the transponder 2 in that case, so that the charging capacitor 3 can be charged rapidly.

The power balance is illustrated in terms of a resonance curve in FIG. 3, in which the frequency f is plotted on the abscissa (X axis) and the oscillation intensity I as a consequence of the exciter variable is plotted on the ordinate (Y axis). If the exciter frequency $f_E$ deviates from the resonant frequency $f_R$, then the intensity I of the oscillation becomes less, and less energy is transmitted to the transponder 2. The optimal operating point $P_0$ is assumed whenever the exciter frequency $f_E$ is equal to the resonant frequency $f_R$. Depending on the difference between the two frequencies, the operating point may be located at lower intensities (see the operating point $P_1$ or $P_2$).

The transponder oscillating circuit 7, 8 is initially excited to oscillate by the exciter frequency $f_{E1}$ of the antenna oscillating circuit 5, 6. If the exciter frequency $f_{E1}$ agrees with the resonant frequency $f_{RA}$ of the transceiver 1, then the intensity I that is generated is highest. Since the transceiver 1 and the transponder 2 are inductively coupled to one another, the most energy is transmitted to the transponder 2 and thus stored in the charging capacitor 3 when the exciter frequency $f_{E1}$ is equal to the resonant frequency $f_{RT}$ of the transponder 2.

When such an anti-theft system is constructed, care is admittedly taken to assure that the exciter frequency $f_{E1}$ will largely agree with the resonant frequency $f_{RA}$ of the transceiver 1 and the resonant frequency $f_{RT}$ of the transponder 2. However, component tolerances both in the transceiver 1 and in the transponder 2 can make the resonant frequencies $f_{RA}$ and $f_{RT}$ and the exciter frequency $f_{E1}$ deviate from one another, so that optimal energy transmission to the transponder 2 and there to the charging capacitor 3 does not occur. At even small deviations of the two frequencies from one another, there could be a considerable drop in the intensity/field intensity of the transmitted alternating field, even with high-quality oscillating circuits (shown in dashed lines on a narrow quality curve in FIG. 3).

An optimal power balance would exist if the components of the oscillating circuits 5, 6 and 7, 8 and of the oscillator 4 were selected in such a way that they exhibit only slight deviations from the desired values and consequently the same conditions always prevail. However, that would involve very major effort and expense. Such external factors as temperature fluctuations can also affect the components, causing conditions to change rapidly. Thus it can simply happen that the maximum energy is not transmitted.

The components of the transponder 2 are subject to particularly pronounced tolerance fluctuations, since the transponder is a "highbred" or "sophisticated" component that is supposed to have only very small dimensions. The resonant frequency $f_{RT}$ of different transponders is therefore usually variable. The quality of the antenna oscillating circuit 5, 6 as a rule is much higher than the quality of the transponder oscillating circuit 7, 8, since the components of the transceiver 1 can be manufactured to greater precision.

In order to assure that the charging capacitor 3 can always charge reliably and completely and can also be recharged reliably and completely, it is provided according to the invention that the resonant frequency $f_{RT}$ of the transponder 2 is measured, and upon recharging or charging again the exciter frequency $f_{E1}$ of the transceiver 1 is changed to a second exciter frequency $f_{E2}$. The second exciter frequency $f_{E2}$ is adapted to the resonant frequency $f_{RT}$ of the transponder 2.

Figure 4:
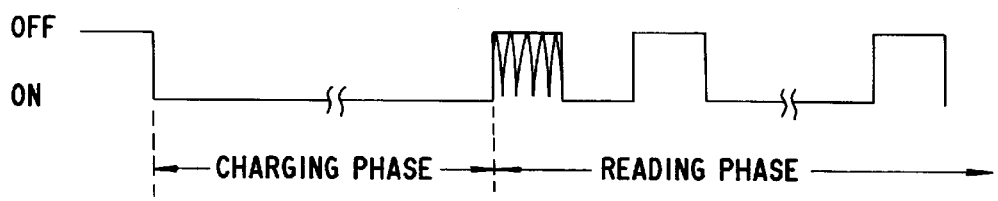
FIG. 4 is a pulse diagram of the anti-theft system.

As soon as the transponder 2 is turned with the ignition key in the ignition lock, the energy of the oscillator 4 is turned on. The oscillator 4 begins to oscillate at a predetermined oscillator frequency $f_0$. The resultant exciter frequency $f_{E1}$, which may be equal to the oscillator frequency $f_0$, is kept constant within the charging phase. As soon as the charging phase has ended, or in other words as soon as the alternating field of the transceiver 1 is turned off (the alternating field of the transceiver 1 is indicated as ON and OFF in FIG. 4), the transponder 2 begins to oscillate at its resonant frequency $f_{RT}$. Since the transponder 2 and the transceiver 1 are inductively coupled to one another, this oscillation affects the transceiver 1.

In the transceiver 1, the transponder oscillation is picked up by a demodulator 13 and digitized, and the resonant frequency $f_{RT}$ is measured by a frequency counter 20 in the demodulator 13. A control unit 14 that is connected to the frequency counter evaluates the result. If the resonant frequency $f_{RT}$ deviates from the exciter frequency $f_{E1}$, then the exciter frequency $f_{E1}$ is adapted to the resonant frequency $f_{RT}$. In other words, the antenna oscillating circuit 5, 6 is subsequently excited at the second exciter frequency $f_{E2}$, which is approximately equal to the resonant frequency $f_{RT}$. For that purpose, a controllable frequency divider 15 or an adjustable oscillator 4 may be used.

The measured resonant frequency $f_{RT}$ may be stored in memory 21 in the transceiver 1. On the next recharging or the next starting procedure, the memorized resonant frequency $f_{RT}$ can be called up, and the oscillator 4 or frequency divider 15 can be set accordingly. This automatically adapts the exciter frequency $f_E$ of the transceiver 1 to the resonant frequency $f_{RT}$ of the transponder 2.

If the transponder 2 is constructed as a crypto transponder, then it calculates a code signal from a random number transmitted by the transceiver 1. To that end, data must be written into and/or read out of the transponder 2. The code signal must also be calculated in a complicated way. The energy of the charging capacitor 3 may not always suffice for that purpose. The charging capacitor 3 must therefore be recharged meanwhile. This recharging takes place already at an adapted exciter frequency $f_{E2}$, which is adapted to the resonant frequency $f_{RT}$. In the next starting procedure, the exciter frequency $f_E$ can be equal to the most recently measured resonant frequency $f_{RT}$. However, it is also possible to re-use the previously set value of the exciter frequency $f_{E1}$ for the next starting procedure.

The measuring of the resonant frequency $f_{RT}$ can also be carried out by measuring one or more oscillations. In order to ensure that the correct resonant frequency $f_{RT}$ is detected, division by the number of oscillations must be performed in the transceiver 1. The value of the resonant frequency $f_{RT}$ can be stored in memory in the transceiver 1. The control unit 14 then retrieves this memorized value and controls either the oscillator 4 or the frequency divider 15. If temperature factors cause the resonant frequency $f_{RT}$ to change, then the previously memorized value can be overwritten, so that continuous adaptation to the current resonant frequency $f_{RT}$ is accomplished.

It is important for the invention to ensure that at least the recharging procedure be performed with an adapted exciter frequency $f_{E2}$. Moreover, the charging procedure in an ensuing starting procedure may also occur with a changed exciter frequency $f_{E2}$. This assures that there is sufficient energy in the transponder 2 to send a code word back to the transceiver 1.

The code word or the code information may be a so-called "fixed code", in which the code word, once defined, does not change in future starting procedures. It is also possible, however, to use a so-called "changing code" or "rolling code". Then the code word transmitted to the transceiver 1 changes for each starting procedure. It is advantageous to use crypto methods to generate the code word. This has advantages in terms of security. Thus the just-transmitted code words cannot be read out from the transponder 2.

We claim:

1. An anti-theft system for a motor vehicle, comprising:

a transceiver disposed in a motor vehicle; and a portable transponder;

said transceiver having an oscillator, an oscillating circuit excited to oscillate at a predetermined first frequency by said oscillator, causing energy signals to be transmitted at a first frequency to said transponder when said transponder is disposed in the immediate vicinity of said transceiver;

said transponder having a transponder oscillating circuit and an energy storing device, said energy storing device receiving the energy signals from said transceiver and is charged by the energy signals, said charged energy storage device causing said transponder oscillating circuit to oscillate at its resonant frequency and transmit data signals at a resonant frequency back to said transceiver;

said transceiver having a frequency counter receiving the data signals and measuring the resonant frequency of said transponder; and said transceiver having a control unit connected to said frequency counter and to said oscillator for controlling said oscillator to excite said oscillating circuit with a second frequency approximately matching the measured resonant frequency of said transponder.

2. The anti-theft system according to claim 1, wherein said transponder has a code generating unit storing a piece of code information in memory and generating a code word from the code information, the code word is transmitted back to said transceiver in the oscillation of said transponder oscillating circuit and amplitude-modulated as a function of the code information.

3. The anti-theft system according to claim 1, wherein said control unit demodulates a code word from an amplitude-modulated oscillation, compares the code word with a desired piece of code information and generates an enable signal if the code word and the desired piece of code information agree.

4. The anti-theft system according to claim 1, wherein said energy storing device is a capacitor.

5. The anti-theft system according to claim 1, wherein said energy storing device is a rechargeable battery.

6. The anti-theft system according to claim 1, wherein a value of the measured resonant frequency is stored in memory in said transceiver and is re-stored only if it deviates from a previously measured value.

7. The anti-theft system according to claim 1, wherein said transponder has a code generating unit storing a computation formula in memory and generating a code word from the computation formula, the code word is transmitted back to said transceiver in the oscillation of said transponder oscillating circuit and amplitude-modulated as a function of the computation formula.

* * * * *